(12) United States Patent
Joung et al.

(10) Patent No.: US 7,238,946 B2
(45) Date of Patent: Jul. 3, 2007

(54) NUCLEAR IMAGING SYSTEM USING SCINTILLATION BAR DETECTORS AND METHOD FOR EVENT POSITION CALCULATION USING THE SAME

(75) Inventors: Jinhun Joung, Algunquin, IL (US); Samir Chowdhury, Chicago, IL (US); John C. Engdahl, Lake Forest, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 847 days.

(21) Appl. No.: 10/609,256

(22) Filed: Jun. 27, 2003

(65) Prior Publication Data

US 2005/0006589 A1   Jan. 13, 2005

(51) Int. Cl.
G01T 1/166 (2006.01)
G01T 1/202 (2006.01)
G01T 1/208 (2006.01)

(52) U.S. Cl. ............................. 250/369; 250/363.04

(58) Field of Classification Search ................ 250/366, 250/367, 368, 369
See application file for complete search history.

(56) References Cited

U.S. PATENT DOCUMENTS 3,825,758 A * 7/1974 Miraldi ................. 250/366
4,823,016 A * 4/1989 Yamashita et al. ...... 250/363.03
4,870,280 A * 9/1989 Yamashita et al. ........... 250/368
7,067,816 B2 * 6/2006 Dorenbos et al. ....... 250/370.11
2005/0253073 A1 * 11/2005 Joram et al. ............ 250/363.03

OTHER PUBLICATIONS

Joung et al. "cMiCE: A high resolution animal PET using continous LSO with a statistics based positioning scheme". IEEE Nuclear Science Symposium Record, vol. 2 (Nov. 4-10, 2001, pp. 1137-1141.*

* cited by examiner

Primary Examiner—David Porta
Assistant Examiner—Frederick F. Rosenberger

(57) ABSTRACT

A gamma camera having a scintillation detector formed of multiple bar detector modules. The bar detector modules in turn are formed of multiple scintillation crystal bars, each being designed to have physical characteristics, such as light yield, to achieve a sufficient spatial resolution for nuclear medical imaging applications. According to another aspect of the invention, the bar detector modules are arranged in a three-dimensional array, where each module is made up of a two-dimensional array of bar detectors with at least one photosensor optically coupled to each end of the module. Such a camera can be used for both PET (coincidence) and single photon imaging applications. According to another aspect of the invention, a bar detector gamma camera is provided, which utilizes an improved positioning algorithm that greatly enhances spatial resolution in the z-axis direction (i.e., the direction along the length of the scintillation crystal bar).

10 Claims, 6 Drawing Sheets

PHOTO-SENSORS

BUNDLE OF SCINTILLATION BARS

PHOTO-SENSORS

NUCLEAR IMAGING SYSTEM USING SCINTILLATION BAR DETECTORS AND METHOD FOR EVENT POSITION CALCULATION USING THE SAME

BACKGROUND OF THE INVENTION

1. Field of the Invention

The present invention generally relates to nuclear medicine, and systems for obtaining nuclear medicine images of a patient's body organs of interest. In particular, the present invention relates to a novel detector configuration for nuclear medical imaging systems that are capable of performing either positron emission tomography (PET) or planar and single photon emission computed tomography (SPECT).

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Two basic types of imaging techniques are PET or "coincidence" imaging, and single photon imaging, also known as planar or SPECT imaging. PET imaging is fundamentally different from single photon imaging. In PET, events are detected from the decay or annihilation of a positron. When a positron is annihilated within a subject, two 511 KeV gamma rays are simultaneously produced which travel in approximately opposite (i.e., 180°) directions. Two scintillation detectors are positioned on opposite sides of the patient such that each detector will produce an electrical pulse in response to the interaction of the respective gamma rays with a scintillation crystal. In order to distinguish the detected positron annihilation events from background radiation or random events, the events must be coincident (i.e., both occur within a narrow time window) in each detector in order to be counted as "true" events. When a true event is detected, the line connecting the positions of the two points of detection is assumed to pass through the point of annihilation of the positron within the subject being imaged.

By contrast, single photon imaging, either planar or SPECT, relies on the use of a collimator placed in front of a scintillation crystal or solid state detector, to allow only gamma rays aligned with the holes of the collimator to pass through to the detector, thus inferring the line on which the gamma emission is assumed to have occurred. Both PET and single photon imaging techniques require gamma ray detectors that calculate and store both the position of the detected gamma ray and its energy.

Present day single photon imaging systems all use large area scintillation detectors (on the order of 2000 cm$^2$). Such detectors are made either of sodium iodide crystals doped with thallium (NaI(Tl)), or cesium iodide (CsI). Scintillations within the NaI crystal caused by absorption of a gamma photon within the crystal, result in the emission of a number of light photons from the crystal. The scintillations are detected by an array of photomultiplier tubes (PMTs) in close optical coupling to the crystal surface. Energy information is obtained by summing the signals from the PMTs that detected scintillation photons, and position information is obtained by applying a positioning algorithm to the quantitative signals produced by the PMT array. The original gamma-ray camera is described in U.S. Pat. No. 3,011,057 issued to Hal Anger in 1961.

The CsI camera is typically used with either a single silicon-based photodiode detector or an array of silicon-based photodiode detectors, which detect scintillation events emitted from the CsI crystal. CsI crystals are used where the relatively low cost, ruggedness and spectral response of the CsI crystal are desired in favor of alternative crystal materials such as NaI.

In PET imaging, scintillation crystals with short response times are required in order to properly detect the coincidence events with high timing resolution. Typically such crystals are chosen from among materials such as NaI, BGO, LSO and BaF$_2$. Detectors coupled to such crystals can be an array of PMTs, a single "position-sensitive" PMT ("PS-PMT"), or fast-response silicon-based photodiodes such as avalanche photodiodes.

Because the conventional Anger camera uses a thin planar sheet or disk of scintillation crystal material, it is necessary to cover the entire field of view of the crystal with light detectors such as PMTs or photodiodes. Additionally, the sampling capability of such scintillation crystals could be improved by increasing the number of gamma photons emanating from an imaging subject that are absorbed by the crystal, and consequently increasing the number of scintillation events that can be detected for use in constructing an image.

The bar detector is a specific configuration of scintillation detector that has been used in astronomical and high energy physics applications. The bar detector consists of an elongated scintillation crystal bar having a relatively small cross section. A photosensor such as a PMT is optically coupled to each end of the bar. The light from a gamma photon event within the scintillation crystal volume is detected by the two PMTs. The timing or signal information can be used to determine the location of the event in the bar. Additional bars can be placed next to each other for two-dimensional detection.

An example of a proposed design for a PET detector module using a bar detector is given in Moses et al., "Design Studies for a PET Detector Module Using a PIN Photodiode to Measure Depth of Interaction," IEEE Transactions on Nuclear Science NS-41, pp. 1441-1445 (1994), incorporated herein by reference in its entirety. According to this design, a scintillation bar is coupled at one end to a PMT, and at the other end to a photodiode, in order to measure the depth of interaction (DOI) of the scintillation event in the bar.

In past bar detector experiments for physics and astronomy, NaI (and sometimes CsI) bars of up to 100 cm were used to detect gamma photons of up to 10 MeV. Positional resolution within the bar ranged from 1.5 cm at 200 keV to 2 cm at 10 MeV, although worse resolutions were reported. An energy resolution of 9.4% and a timing resolution of 10 ns at 662 keV and a 100 cm NaI bar were reported by a physics group for a balloon borne gamma telescope. Energy resolutions from other experiments were higher for the same energy gamma photon. These studies have cited geometry, bar size, light attenuation coefficient and electronic noise as the major factors in determining the spatial and energy resolution of bar detectors. However, the performance of bar detectors as designed in the prior art is insufficient for use in medical imaging applications.

It would be desirable to use a bar detector in medical imaging applications. First, the bar detector can achieve the same field of view as a conventional Anger camera with a significantly smaller number of PMTs. This is because a scintillation event occurring anywhere within the length of the bar can be detected by the light sensors optically coupled to the ends of the bars using a DOI calculation. Thus, photodetectors do not need to be placed over the entire field of view as in the conventional Anger camera. Additionally, multiple bars can be placed next to each other in a two dimensional array, creating a detector module than can localize the gamma photon interaction in a three dimensional volume, allowing for depth of interaction (DOI) decoding capability. This DOI information can enhance the spatial resolution of a positron emission tomograph system by improving sampling characteristics of the detector system, as the total thickness of the module can be larger than the thickness of a single crystal and thus can interact with a higher percentage of gamma photons emanating from a subject. Additionally, for SPECT systems, the bar detector module presents a very economical modality for constructing a camera with substantial advantages over a conventional planar camera (see FIGS. 3a-3b), including high throughput and elimination of the necessity for gantry motion.

SUMMARY OF THE INVENTION

The present invention solves the existing need by providing a gamma camera having a scintillation detector formed of multiple bar detector modules. The bar detector modules in turn are formed of multiple scintillation crystal bars, each being designed to have characteristics to achieve a sufficient spatial resolution for nuclear medical imaging applications.

According to another aspect of the invention, the bar detector modules are arranged in a three-dimensional array, where each module is made up of a two-dimensional array of bar detectors with at least one photosensor optically coupled to each end of the module. Such a camera can be used for both PET (coincidence) and single photon imaging applications.

According to another aspect of the invention, a bar detector gamma camera is provided, which utilizes an improved positioning algorithm that greatly enhances spatial resolution in the z-axis direction (i.e., the direction along the length of the scintillation crystal bar.

In particular, the present invention provides a gamma camera, including a number of bar detector modules arranged in a three-dimensional array, each of the modules including a number of elongated scintillation crystal bars, each bar having two end surfaces, the number of bars being arranged in a two-dimensional array with respect to the end surfaces, and at least two photosensors, each optically coupled to a respective end of the module.

According to another aspect of the invention, a gamma camera is provided, including a number of bar detector modules, each including a number of elongated scintillation crystal bars, each bar having two end surfaces, the plurality of bars being arranged in a two-dimensional array with respect to the end surfaces, and at least two photosensors, each optically coupled to a respective end of the module, for detecting a scintillation interaction of a gamma photon with one of the bars; and a position calculator for determining the spatial location of a detected scintillation interaction in the elongated dimension of a scintillation crystal bar, according to the formula:

$$\hat{z} = \arg\min_{\forall z} \min_{z=\hat{z}} \left( \frac{(R - \mu_R(z))^2}{\sigma_R^2(z)} \right)$$

where z is the elongated dimension of said bar, $$R = \frac{E_1 - E_2}{E_1 + E_2},$$

$E_1$=the total energy detected at a first end of said bar,
$E_2$=the total energy detected at a second end of said bar,
$\mu R$=the mean of ratio R at a given location z, and
$\sigma R$=the variance of the ratio R at a given location z.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1C:
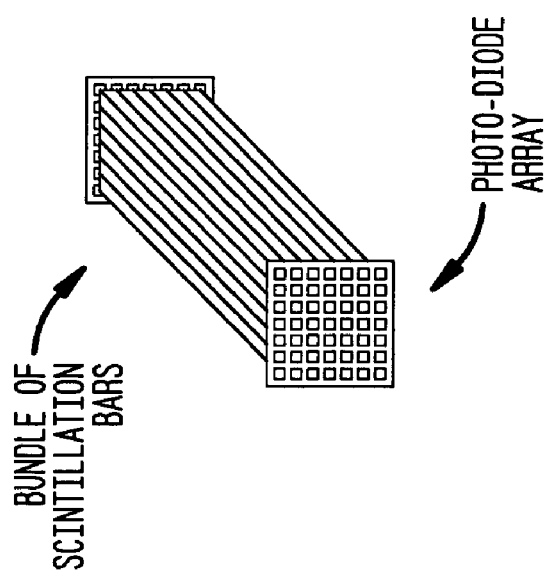
FIGS. 1(a)-1(c) are isometric views of various configurations of scintillation bar detector modules for use as building blocks in a gamma camera, according to the present invention.
Figure 1B:
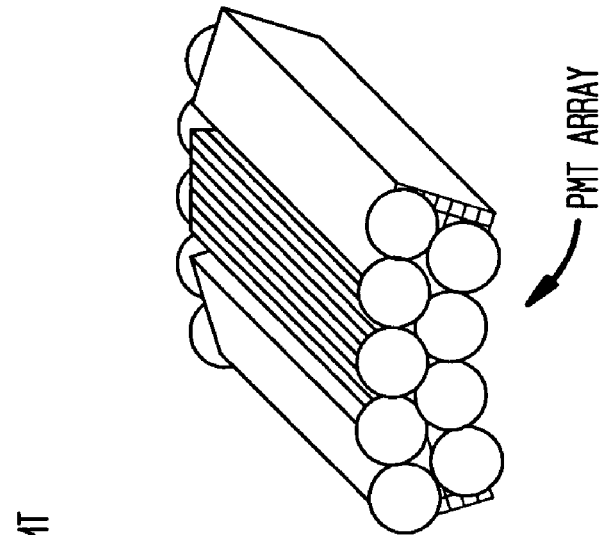
Figure 1A:
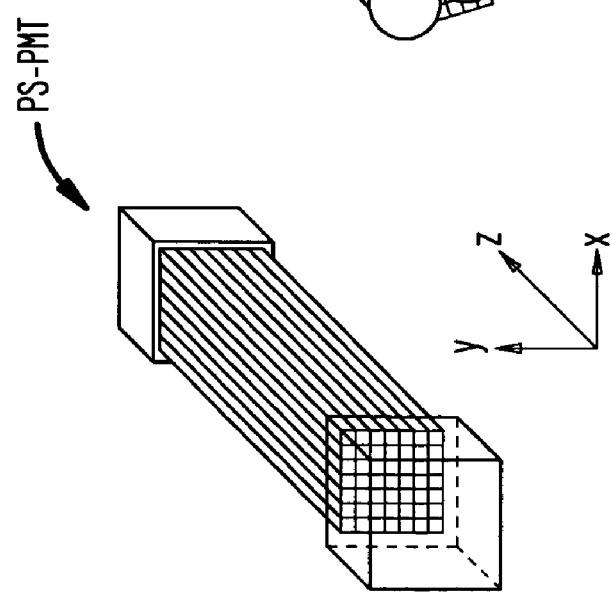

Referring to FIGS. 1(a)-1(c), according to one preferred embodiment of the invention, a bar detector module is constructed by bundling together a number of scintillation crystal bars in a two-dimensional array in the X-Y direction as shown. A nuclear medical imaging gamma camera then can be constructed by aggregating a number of modules together in a preferred geometry to establish a desired field of view for medical imaging applications. In the examples illustrated, the bars are arranged in a 7×7 square; however, many other configurations are possible and contemplated according to the invention. The bar detector module is optically coupled at each end to at least one photosensor. As shown in FIG. 1(a), each module may be optically coupled to a position-sensitive photomultiplier tube (PS-PMT). The PS-PMT is a known photosensor that has the ability to identify the X-Y location of light photons incident on its detection surface and produce an electric signal indicative of such X-Y location, in addition to indicating the intensity of the incident light photons. Similarly, as shown in FIG. 1(c), the bar detector module may be optically coupled to a pair of photodiode arrays, where each photodiode in the array corresponds to an individual scintillation crystal bar in the module. In each of these arrangements, the signal intensity information from the photosensors at each end of the module is used to calculate the DOI information, i.e., location or position information along the Z-axis.

Alternatively, as shown in FIG. 1(b), an array of PMTs may be optically coupled to the ends of a number of bar detector modules aggregated together in a particular geometry. The PMT array is similar in function to the conventional PMT array provided with a single scintillation crystal sheet. According to the invention, however, the position information provided by both PMT arrays is used to calculate DOI position information in the Z direction, as well as calculating X-Y position information.

The X and Y directional spatial resolution is mainly determined by the cross-sectional area of the bar. However, there are many factors affecting the performance of the Z directional resolution such as cross-sectional area, surface treatment of the bar surfaces, and light output and length of the bar. A key factor among these is the length of the bar. The effect of bar length on Z-axis spatial resolution is shown in FIGS. 2(a)-2(d). In these graphs, the cross-section of the bar was simulated to be 4×4 mm$^2$, with respective lengths of 5 cm, 10 cm and 20 cm for FIGS. 2(a),(c) and (d), with the long surfaces being ground. A statistics-based positioning algorithm, described in detail below, was employed except in case (b), where a conventional centroid positioning algorithm was used. In all cases, the photosensor quantum efficiency and scintillation photons per gamma event were set to 0.25 and 20,000, respectively.

Figure 2A:
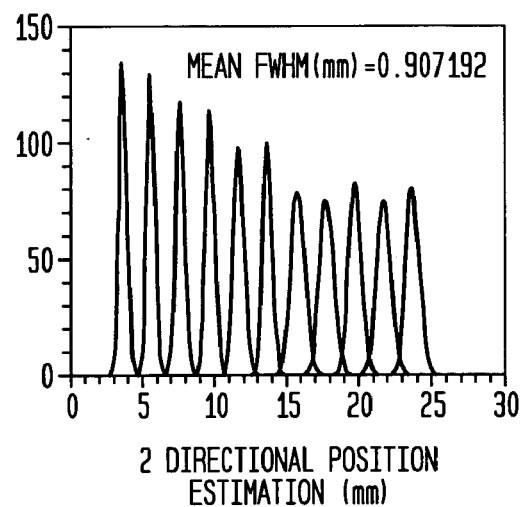
FIGS. 2(a)-2(d) are graphs illustrating point spread function profiles for test points in scintillation crystal bars constructed according to the concepts of the present invention.
Figure 2B:
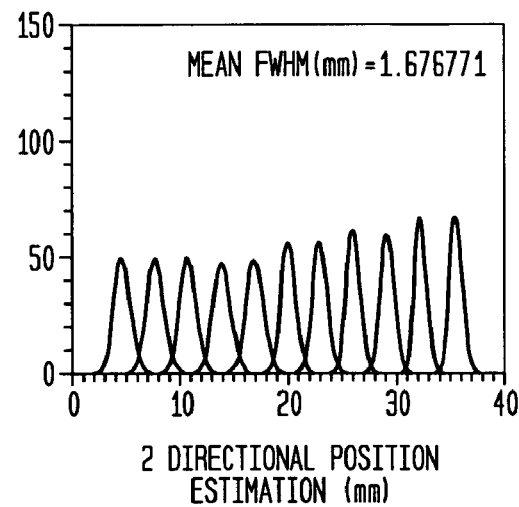
Figure 2C:
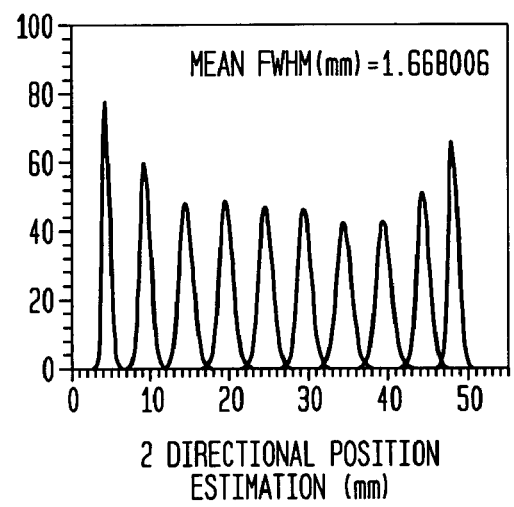
Figure 2D:
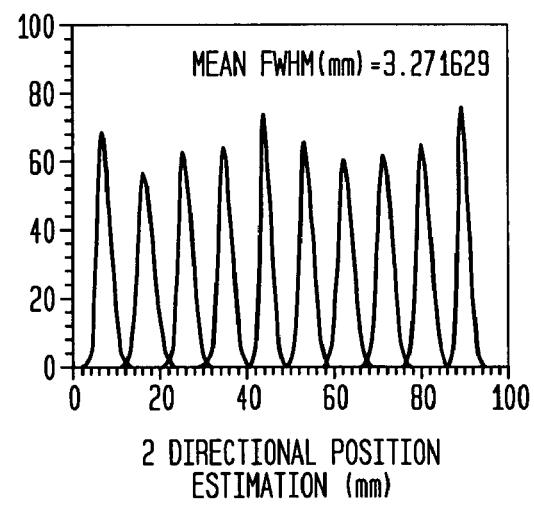

The mean full width half maximum (FWHM) of the point spread function of test points along the z-direction was 0.9 mm, 1.7 mm and 3.8 mm for the 5 cm, 10 cm and 20 cm length bars, respectively, as shown in FIGS. 2(a), 2(c) and 2(d), using the statistics-based positioning algorithm described below. In FIG. 2(b), a 5 cm long bar was used with a conventional centroid positioning scheme. FWHM is a technical term used to describe a measurement of the width of an object in a picture, where that object does not have sharp edges, as is the case with light photons spreading out from a scintillation event in all directions. The light distribution generally has a Gaussian profile. Because the "width" of the profile extends to infinity, it is not possible to describe the extent of such profile. An alternative way to describe the approximate size of the object is to specify the width across the profile when it drops to half of its peak, or maximum, value. This corresponds to the full width of the object image at half maximum value, or FWHM. Thus, smaller values of FWHM correspond to higher spatial resolutions. FIG. 2(a) shows that for a 5 cm long bar using the novel statistics-based positioning algorithm described below, a very good FWHM value of 0.9 mm was achieved.

Figure 3C:
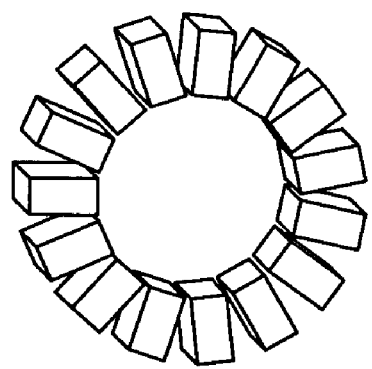
FIGS. 3(a)-3(c) are perspective views of various three-dimensional configurations of bar detector modules for use in gamma cameras according to the present invention.
Figure 3B:
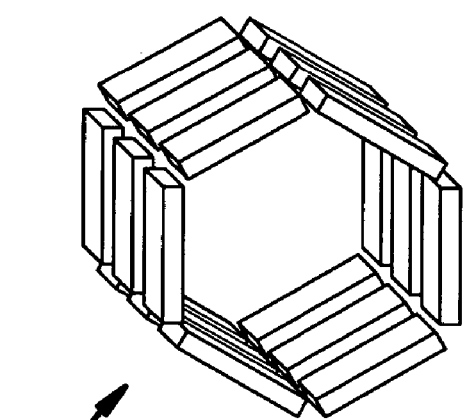
Figure 3A:
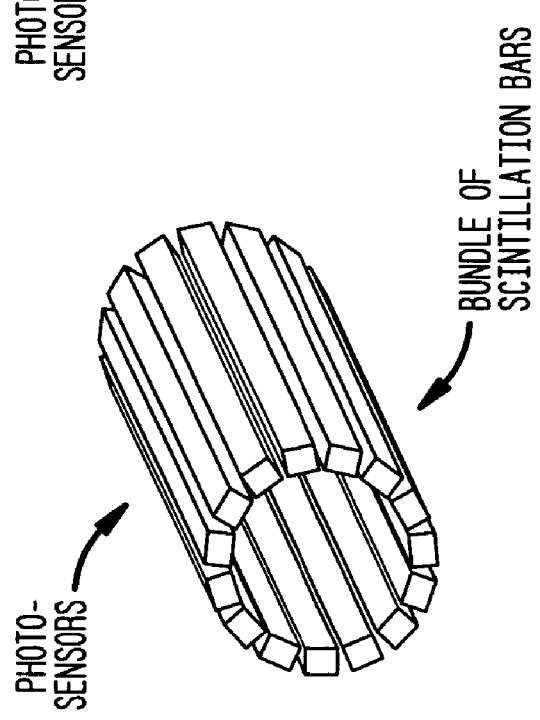

By selecting the orientation, length and the size of the cross-sectional area of the scintillation bar, diverse imaging systems can be implemented with desired system configuration, performance and cost. FIGS. 3(a)-3(d) show examples of such applications. For instance, the configuration in FIG. 3(a) provides a low-end but quite economical system by using less photosensors per field of view (FOV) area, while the configurations shown in FIGS. 3(b) and 3(c) can be used for high resolution systems.

The light yield property of a scintillator detector also is important in determining the spatial and energy resolution of any proposed system. Prior art bar detectors exhibited insufficient spatial resolution (about 1 cm FWHM) for nuclear medicine imaging due to the poor light yield properties of the scintillation crystal.

Figure 4:
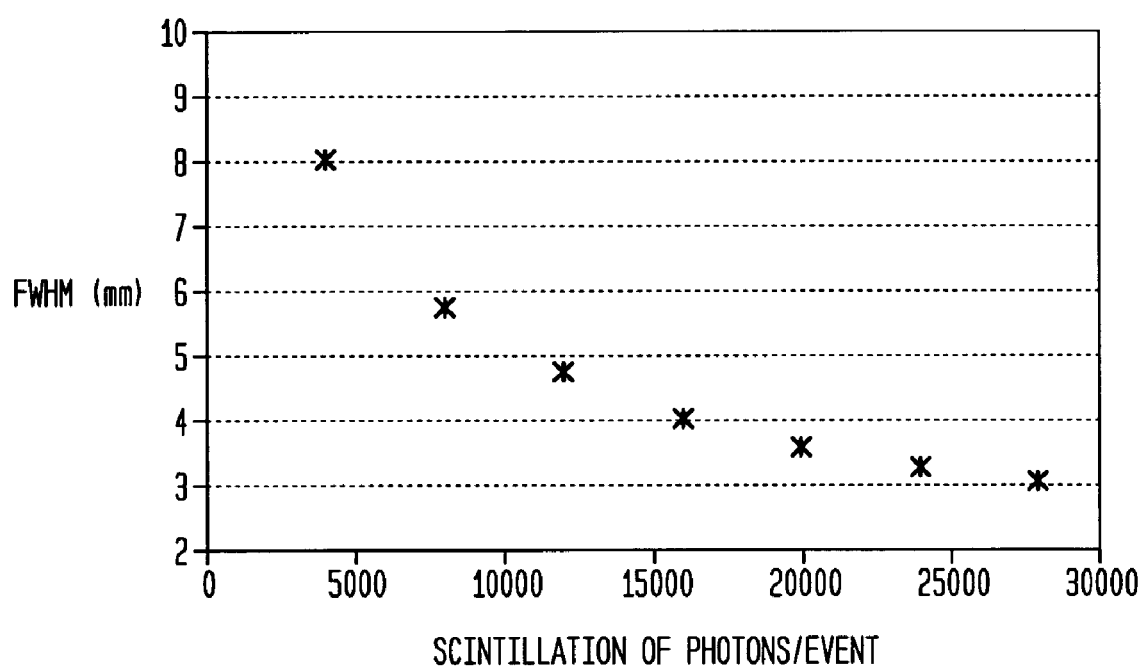
FIG. 4 is a graph showing spatial resolution as a function of scintillation light yield for a bar detector constructed according to the present invention.

FIG. 4 shows Monte-Carlo simulation results of spatial resolution as a function of the number of scintillation photons per gamma event. The mean FWHM value was calculated from a number of test points along a 20 cm long by 4×4 mm$^2$ cross-section bar detector as a function of scintillation photons. The quantum efficiency (QE) of the photosensor was assumed to be 0.25. The results conform to the theoretic fact that spatial resolution is inversely proportional to the square root of the total light output.

In order to achieve sufficient spatial resolution for nuclear medicine imaging applications, i.e., at least ~4-5 mm FWHM, the light yield of scintillation crystal must be higher than about 12,000 photons per event, as shown by the results depicted in FIG. 4. This is equivalent to scintillating an NaI crystal with ~300 keV gamma photons and collecting the scintillation light photons with a typical PMT array having 0.25 QE. Therefore, high light yield scintillation materials such as NaI, LaCl3, LaBr3 or LSO are preferred for high resolution medical imaging applications. LaCl3 and LaBr3 are newly developed crystals with very high light output and extremely fast decay times. By utilizing these new scintillator materials, the performance of the bar detector can be greatly improved over prior art systems, allowing for its use in nuclear medicine imaging. Physical characteristics of the scintillator materials are listed in table 1.

TABLE 1

Physical properties of inorganic scintillators with high light output.

| | NaI | LaCl3 | LaBr3 | LSO |
|---|---|---|---|---|
| Density (g/cm$^3$) | 3.67 | 3.86 | 5.29 | 7.4 |
| $Z_{eff}$ | 51 | 50 | 47 | 66 |
| Light output (ph/MeV) | 39000 | 49000 | 63000 | 28000 |
| Decay time (ns) | 230 | 25 | 35 | 40 |
| Peak emission | 415 | 330–352 | 358–385 | 420 |
| Hygroscopic | Yes | Yes | Yes | No |

Collection efficiency of the scintillation light photons plays another significant role in bar detector performance. Light collection performance is determined by the sensitivity and quantum efficiency of the photodetector. In the prior art, PMTs and PS-PMTs were used as photosensor devices. Recent innovations have improved the performance of photosensors. These developments have also provided new photosensors with superior characteristics. These include inorganic photodiodes (silicon drift, PIN, avalanche) and organic photodiode arrays.

The conventional estimator of the Z position used in the prior art is as follows:

$$\hat{z} = k \cdot \left( \frac{E_1 - E_2}{E_1 + E_2} \right) + r \qquad (1)$$

where k is a scale factor, r is an offset, E1 and E2 are the total energy signals of the D1 and D2 PMTs, respectively. Since equation (1) is a linear estimation of the event position based on the non-linear ratio of the photosensor energy signals along the bar, inefficient and biased estimation is unavoidable. In addition, post processing of the bias correction technique is required.

Positioning estimation is greatly improved by using a statistics based un-biased estimator for the invention. The novel estimator is follows:

$$\hat{z} = \underset{\forall z}{\arg\min}_{z=\hat{z}} \left( \frac{(R - \mu_R(z))^2}{\sigma_R^2(z)} \right) \quad (2)$$

where R is the ratio between the D1 and D2 energy signal for a given event, i.e., $$R = \frac{E_1 - E_2}{E_1 + E_2},$$

and $\mu_R(Z)$ and $\sigma_R^2(z)$ are the mean and variance of the ratio R at a given z location, respectively. The $\mu_R(Z)$ and $\sigma_R^2(z)$ must be pre-computed and stored in a look-up table. The ratio R is an index of the spatial resolution.

Figure 5:
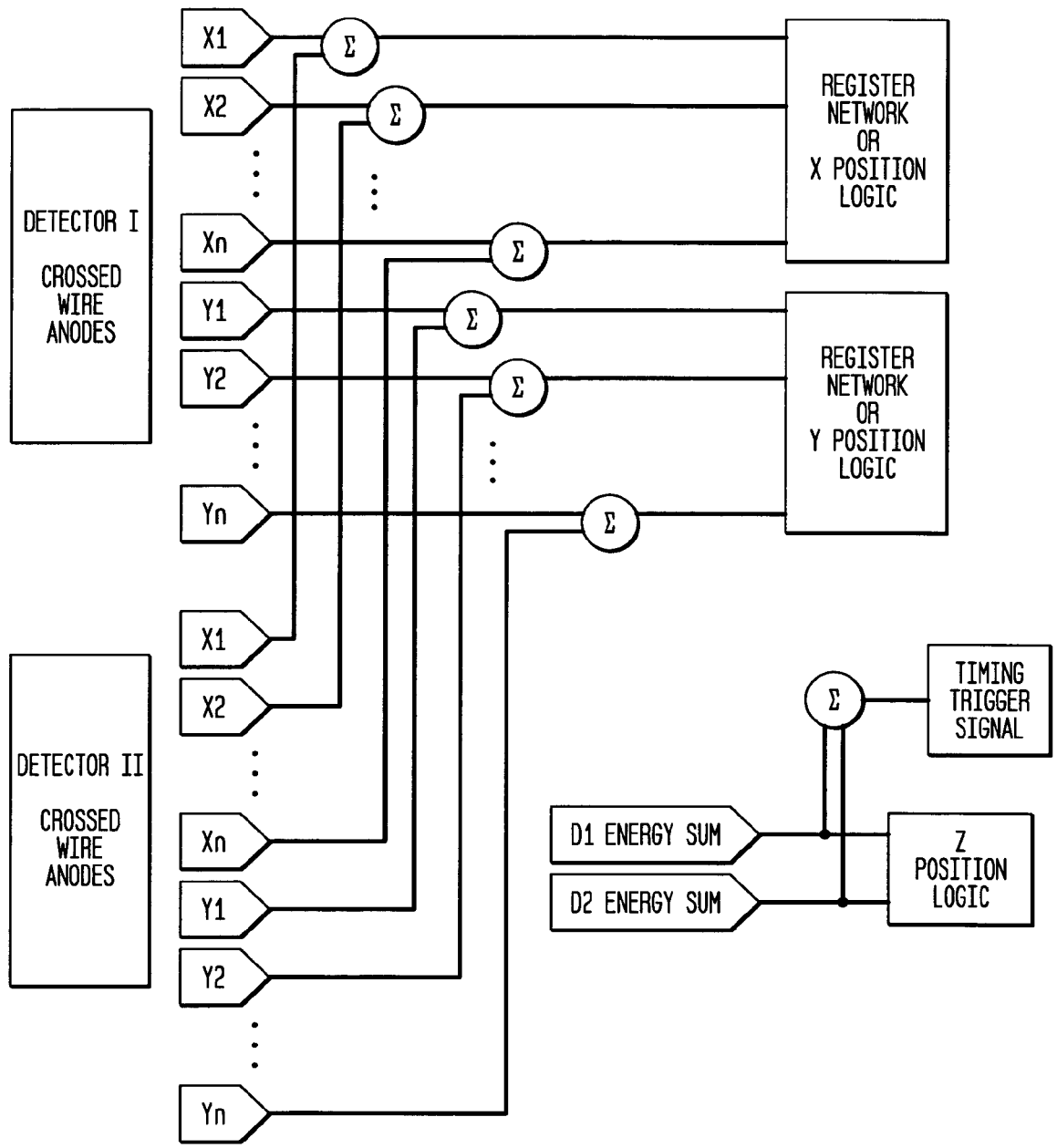
FIG. 5 is a circuit block diagram of a position calculation circuit for calculating spatial location of scintillation events in a bar detector gamma camera according to the present invention, using position-sensitive photomultiplier tubes (PS-PMTs) as photosensor elements.

FIG. 5 shows a block diagram of one example of a position decoding circuit, using a position decoding scheme with a crossed wire anode PS-PMT. The positions of the gamma ray interaction in the bar detector module in the X-Y plane are calculated based on the summed anode signals from both PS-PMTs mounted at the ends of the module. As shown, the individual signals from separate X and Y position anodes are summed and inputted to an Anger logic matrix or a registered network technique to calculate the centroid of the distributed electric current at both of the crossed anodes. The Z direction position is computed based on the total energy of the signals from the photosensors using the statistics-based positioning scheme explained in equation (2) above.

Comparison of FIGS. 2(a) and 2(b) shows the improvement in spatial resolution using the proposed statistics-based positioning (SBP) algorithm over the conventional centroid estimator algorithm of equation (1). Specifically, by using the SBP algorithm, the FWHM in a 5 cm long bar detector improved from 1.67 mm using the centroid estimator (FIG. 2(b)), to 0.91 mm (FIG. 2(a)). In addition, the SBP algorithm does not require any linearity correction.

Another significant property in achieving an acceptable bar detector for nuclear medical imaging application is the surface property of the bar detector. The surface treatment of the scintillation bar detector influences three factors that determine detector performance: (1) light collection efficiency; (2) linearity of light collection as a function of position; and (3) the light collection ratio between the photosensors. Possible surface treatments may include the addition of reflectors, polishing (grounding) and etching of the long sides of the bar detectors.

Figure 6A:
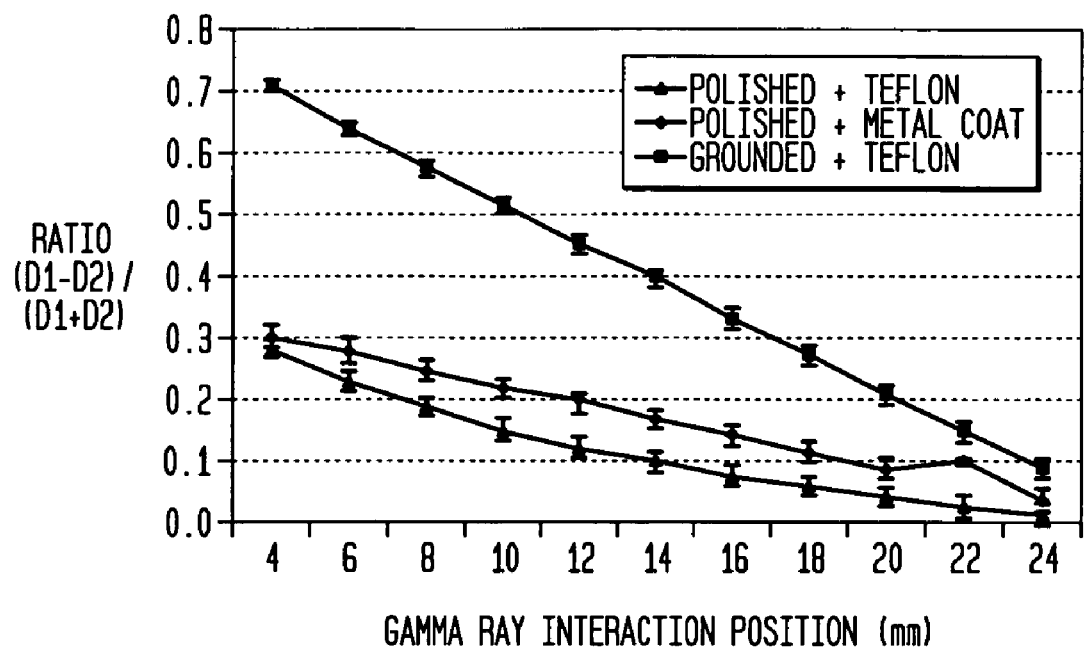
FIGS. 6(a)-6(b) are graphs illustrating the effects of various surface treatments of scintillation crystal bars according to the present invention, with respect to spatial and energy resolution.
Figure 6B:
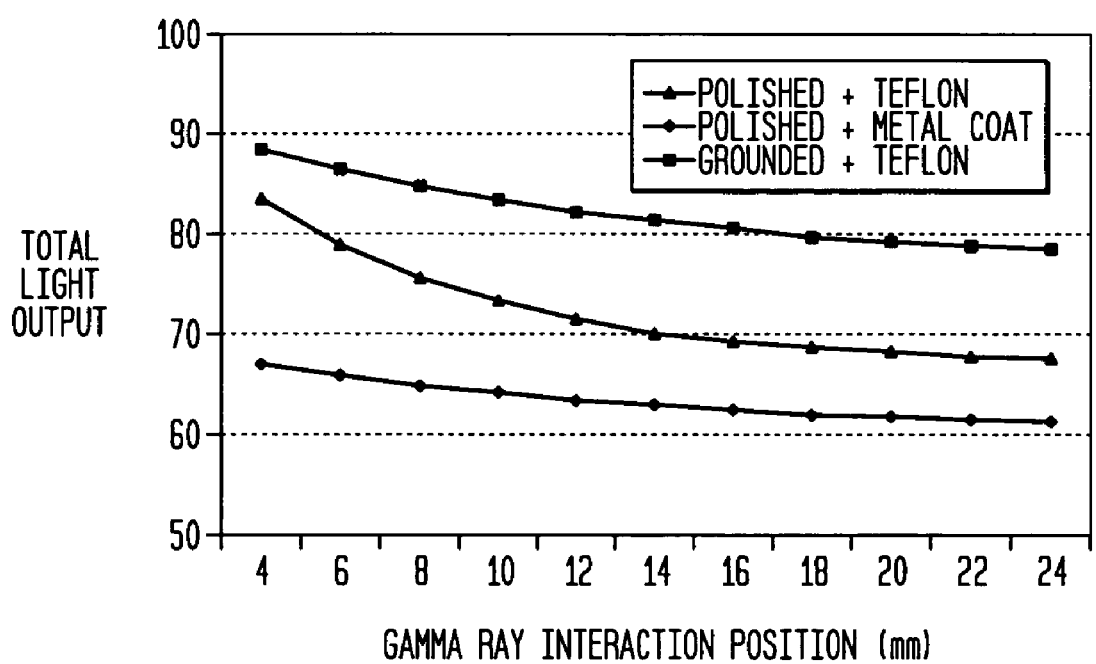

According to one preferred embodiment, the four long sides of the bar surface are grounded and sealed with a high reflectivity material such as TiO2, MgO powder/paint or Teflon® tape/film for optical isolation and maximization of light collection performance of each scintillation bar. The surface condition versus expected spatial and energy resolution is shown in FIGS. 6(a) and 6(b). Polished surface with reflector, polished surface with metal coating and grounded surface with reflector cases were tested with a 4×4 mm² cross section by 5 cm long bar. In all cases, reflectivity of the reflector was chosen to be 98%. This simulation demonstrates that the grounded surface provides optimum attenuation of scintillation photons at the surfaces, maximizing the slope of ratio R, defined in equation (2), as a function of location Z. This yields an enhanced spatial resolution.

In addition, the surface treatment provides a linear light response, which represents a uniform spatial resolution with respect to position.

As described above, the novel bar detector module-based gamma camera for medical imaging exhibits many advantages over the prior art, including:

1) Three dimensional position sensitivity;
2) Improved spatial resolution through use of statistics-based positioning algorithm, which also provides unbiased estimation of a gamma ray interaction position in the detector;
3) Maximized position estimation accuracy and uniformity along the z-direction by using grounded surfaces and other surface treatments for the scintillation bar;
4) Further enhanced resolution by use of new photosensors with improved sensitivity and quantum efficiency;
5) Improved system performance through use of new high light output, fast decay scintillators; and
6) Ability to implement many diverse custom system configurations and associated performance and cost characteristics based on the selection of orientation and dimensions of the bars and modules, allowing for use in nuclear medicine imaging systems.

The invention having been described, it will be apparent to those skilled in the art that the same may be varied in many ways without departing from the spirit and scope of the invention. Any and all such modifications are intended to be included within the scope of the following claims.

What is claimed is:

1. A gamma camera, comprising:
a plurality of bar detector modules, each comprising a plurality of elongated scintillation crystal bars, each bar having two end surfaces, said plurality of bars being arranged in a two-dimensional array with respect to said end surfaces, and at least two photosensors, each optically coupled to a respective end of said module, for detecting a scintillation interaction of a gamma photon with one of said bars; and
a position calculator for determining the spatial location of a detected scintillation interaction in the elongated dimension of a scintillation crystal bar, according to the formula:

$$\hat{z} = \underset{\forall z}{\arg\min}_{z=\hat{z}} \left( \frac{(R - \mu_R(z))^2}{\sigma_R^2(z)} \right)$$

where z is the elongated dimension of said bar, $$R = \frac{E_1 - E_2}{E_1 + E_2},$$

$E_1$=the total energy detected at a first end of said bar,
$E_2$=the total energy detected at a second end of said bar,
$\mu_R$=the mean of ratio R at a given location z, and
$\sigma_R$=the variance of the ratio R at a given location z.

2. The gamma camera of claim 1, wherein said at least two photosensors comprise photomultiplier tubes.

3. The gamma camera of claim 1, wherein said at least two photosensors comprise position-sensitive photomultiplier tubes.

4. The gamma camera of claim 1, wherein said at least two photosensors comprise photodiode arrays.

5. The gamma camera of claim 1, wherein said scintillation crystal bars are formed of Csl.

6. The gamma camera of claim 1, wherein said scintillation crystal bars are formed of LaBr3.

7. The gamma camera of claim 1, wherein said scintillation crystal bars are formed of LaCl3.

8. The gamma camera of claim 1, wherein said scintillation crystal bars have grounded elongated surfaces.

9. The gamma camera of claim 8, wherein said grounded elongated surfaces are sealed with a high reflectivity material for increasing optical isolation and maximizing light collection.

10. The gamma camera of claim 1, wherein said camera is used for SPECT imaging applications.

* * * * *